United States Patent
Papy et al.

(10) Patent No.: US 12,546,644 B2
(45) Date of Patent: Feb. 10, 2026

(54) WEIGHING SYSTEM FOR AN APPARATUS ABLE TO DELIVER A PREDETERMINED MASS, AND CORRESPONDING METHOD

(71) Applicant: BEABA, Paris (FR)

(72) Inventors: Hervé Papy, Oyonnax (FR); Sylvain Benoit, Meillonnas (FR); Adrien Herve, Bron (FR)

(73) Assignee: BEABA (FR)

( * ) Notice: Subject to any disclaimer, the term of this patent is extended or adjusted under 35 U.S.C. 154(b) by 251 days.

(21) Appl. No.: 18/278,284

(22) PCT Filed: Feb. 23, 2022

(86) PCT No.: PCT/FR2022/050325
§ 371 (c)(1),
(2) Date: Aug. 22, 2023

(87) PCT Pub. No.: WO2022/180338
PCT Pub. Date: Sep. 1, 2022

(65) Prior Publication Data
US 2024/0133732 A1  Apr. 25, 2024
US 2024/0230395 A9  Jul. 11, 2024

(30) Foreign Application Priority Data

Feb. 25, 2021 (FR) ...................................... 2101830

(51) Int. Cl.
G01G 13/22 (2006.01)
G01G 7/02 (2006.01)
G01G 17/00 (2006.01)

(52) U.S. Cl.
CPC ............... *G01G 13/22* (2013.01); *G01G 7/02* (2013.01); *G01G 17/00* (2013.01)

(58) Field of Classification Search
CPC ............. G01G 13/22; G01G 7/00; G01G 7/02
See application file for complete search history.

(56) References Cited

U.S. PATENT DOCUMENTS

| | | | | |
|---|---|---|---|---|
| 4,574,896 A | * | 3/1986 | Friedrich | G01G 11/00 |
| | | | | 177/16 |
| 5,097,988 A | * | 3/1992 | de Deyne | G01G 13/22 |
| | | | | 222/77 |

(Continued)

FOREIGN PATENT DOCUMENTS

| DE | 1549301 A1 | 12/1970 |
|---|---|---|
| DE | 3916868 A1 | 11/1990 |

(Continued)

OTHER PUBLICATIONS

International Search Report and Written Opinion for corresponding PCT Application No. PCT/FR2022/050325, mailed Jun. 20, 2022 (5 sheets).

(Continued)

*Primary Examiner* — Natalie Huls
(74) *Attorney, Agent, or Firm* — Womble Bond Dickinson (US) LLP (57) ABSTRACT

The invention relates to a system (10) for weighing a predetermined mass of a food product, comprising an electric stepping motor (30) supported by a chassis (11) and having an output shaft, a food-product receiving member (22) which is able to move along the axis of travel between a position for receiving and a position for tipping out the food product, and an electronic control unit for controlling the electric motor. According to the invention, the receiving member is unable to move independently of the output shaft and the weighing system is configured so that, in the receiving position, the receiving member and food product apply a static torque to the output shaft, and that the electronic control unit is configured to apply a resistive torque, for a predetermined mass of the food product, to the output shaft so that when the static torque is at least equal to the resistive torque, the output shaft changes position.

13 Claims, 5 Drawing Sheets

(56) References Cited

U.S. PATENT DOCUMENTS

| | | | | |
|---|---|---|---|---|
| 6,041,664 A | * | 3/2000 | Hafner | G01F 1/8454 |
| | | | | 73/861.353 |
| 2002/0007799 A1 | * | 1/2002 | Berg | G01G 21/23 |
| | | | | 119/53 |
| 2002/0158080 A1 | * | 10/2002 | Matsunaga | C04B 37/026 |
| | | | | 222/94 |
| 2006/0008330 A1 | * | 1/2006 | Hafner | G01G 13/028 |
| | | | | 222/77 |
| 2018/0264490 A1 | * | 9/2018 | Fushimi | B05B 7/1486 |
| 2022/0000314 A1 | * | 1/2022 | Pachi | G01G 13/2906 |

FOREIGN PATENT DOCUMENTS

| | | |
|---|---|---|
| DE | 296 20 108 U1 | 3/1998 |
| EP | 1 145 627 A2 | 10/2001 |
| JP | 54-107364 U | 7/1979 |
| JP | H0460424 A | 2/1992 |
| JP | 2013145216 A | 7/2013 |

OTHER PUBLICATIONS

Japan Office Action dated Dec. 5, 2025, in corresponding Japanese Patent Application No. 2023-550583, 4 pages (including Translation copy of JP-OA).

* cited by examiner

WEIGHING SYSTEM FOR AN APPARATUS ABLE TO DELIVER A PREDETERMINED MASS, AND CORRESPONDING METHOD

CROSS-REFERENCE TO RELATED APPLICATIONS

This application is a U.S. National Phase Patent Application and claims priority to and the benefit of International Patent Application No. PCT/FR2022/050325, filed on Feb. 23, 2022, which claims priority to French Patent Application No. FR2101830, filed on Feb. 25, 2021. The entire contents of both of which are incorporated herein by reference.

TECHNICAL FIELD OF THE INVENTION

This invention relates to a weighing system for weighing a predetermined mass of a food product for an apparatus capable of delivering this predetermined mass of food product. The apparatus is particularly suitable for preparing a beverage such as a baby bottle based on milk powder.

TECHNICAL BACKGROUND

There are various weighing systems for food products used in the beverage preparation. Many weighing systems comprise a conduit in which an endless screw extends, which is driven in rotation by driving means. The endless screws are particularly suitable for dosing food powders such as the milk powder for the baby bottle preparation. The weighing system also comprises a hopper in which a quantity of milk powder is supplied and is intended to feed the endless screw via an opening provided in the wall of the conduit. The rotation and/or the number of revolutions of the endless screw in the conduit allows a predetermined quantity of milk powder to be delivered towards a food product outlet.

However, the amount of product delivered by the endless screw is not accurate. The milk powder delivery is performed on the basis of an average density without taking into account the granulometry or the granular rheology of the powders. The milk powders have different granulometries and/or densities depending on the nutritional needs of the child. In addition, there are major variations in the mass of milk powder actually delivered due to the density variations in the dry state and the mass of water absorbed by the powder depending on its storage conditions upstream of the hopper (inside the apparatus and outside of it). The presence of moisture in the milk powder considerably alters its flowing. In addition, when the endless screw stops, a quantity of powder escapes from the end section of the endless screw and is delivered after the motor of the endless screw has stopped. All these elements distort the measurement of the mass of milk powder delivered.

A weighing system for weighing milk powder is also known, comprising a measuring chamber and a plate which is free to rotate about an axis of rotation and which is installed in the measuring chamber. A hopper is intended to feed the measuring chamber with milk powder. The plate is connected at one end to powder weighing means which are pressure-sensitive and which are connected to an electronic control unit. The other end of the plate is connected to abutment means. When the mass of powder falling by gravity reaches a value desired by the pressure-sensitive means, the electronic control unit orders the rotation of a stepping motor which carries a cam designed to come into abutment against the abutment means. The abutment means actuated by the cam then drive the plate to rotate. The quantity of powder is discharged through a discharge orifice in the measuring chamber. However, the desired quantity of milk powder is not accurate because the measurement does not take into account the different granulometries, densities and/or granular rheology of the milk powder as stated above. Furthermore, this system is complex and costly because it involves several members to measure a precise mass and to deliver this precise mass.

Other examples of weighing systems are described in the documents DE-A1-1549301 and DE-U1-29620108. In the document DE-A1-1549301, the weighing system comprises various elements for operating various actions, such as, among others, a rod arranged at a distance from a magnet for determining a mass of a food to be weighed, a receiving member for receiving the food to be weighed which is connected to a counterweight and micro-relays for holding the receiving member for a predetermined time during the discharging. The counterweight allows to bring the receiving member back into position. The distance between the rod and the magnet used to determine the mass to be reached is a dimensional quantity. Such a system is unreliable and expensive.

The aim of the present invention is to provide a weighing system that is accurate, reliable and economical.

SUMMARY OF THE INVENTION

This is achieved in accordance with the invention by a weighing system for weighing and discharging a predetermined mass of a food product, the device comprising:
  a chassis,
  an electric stepping motor carried by the chassis and having an output shaft capable of adopting different positions along a displacement axis,
  a receiving member for receiving the food product which is movable along the axis of displacement between a receiving position for receiving the food product and a discharging position for discharging the food product, the receiving member being configured to contain or retain a predetermined mass of the food product in the receiving position and to let this mass fall in the discharging position,
  an electronic control unit for controlling the electric motor, the receiving member being secured in terms of displacement to the output shaft, and in that the weighing system is configured in such a way that, in said receiving position, the receiving member and the food product that it contains or retains, apply a static torque to the output shaft, and the electronic control unit being configured so as to apply a resistive torque, for a predetermined mass of the food product, to the output shaft so that, when the static torque is at least equal to the resistive torque, the output shaft changes position.

Thus, this solution allows to achieve the above-mentioned objective. In particular, the value of the desired mass when reached induces a static load torque which causes loss of synchronism of the motor. By "loss of synchronism" we mean a phenomenon of desynchronization of the rotor of a motor, which can occur in the event of an impact or when a torque applied to the shaft of the motor is equal to or greater than the position holding torque of the motor. The motor is no longer able to maintain the position and slips or loses of synchronism, causing the motor to change step involuntarily. The invention uses this phenomenon to accurately detect the precise mass of the food product discharged into the receiving member. The implementation and the installation of such a system is simple and economical, as it uses physical phenomena that are classically found in the motors. The measurement of the torque of the motor follows a linear law, making this solution an adaptive system. In terms of simplicity, the stepping motor allows several actions/functions to be operated, namely setting the mass to be reached, holding the receiving member until the predetermined mass is reached, tilting the receiving member and returning it to position. The stepping motor takes up very little space, making the system extremely compact. In addition, the stepping motor allows an electromagnetic quantity to be set, which is much more reliable than a dimensional quantity.

The system comprises the following characteristics alone or in combination:
  the electronic control unit is configured to control the displacement of the output shaft and the displacement of the receiving member between the receiving position and the discharging position when the mass of food product reaches a predetermined value.
  the predetermined mass of the food product contained in the receiving member and the receiving member have a centre of gravity which is located at a predetermined distance from the axis of displacement A.
  the receiving member comprises connecting means secured to a drive shaft, said drive shaft being rotationally coupled to the output shaft of the electric motor movable in rotation.
  the receiving member is in the form of a bucket.
  the receiving member is in the form of a receiving wall.
  the receiving wall has a flat or curved receiving surface.
  the chassis comprises a platform provided with an opening passing through the wall of the platform on either side and through which the food product is intended to fall by gravity.
  the weighing system comprises detection means capable of detecting at least one position of the output shaft of the stepping motor, the detection means being connected to the electronic control unit.
  the predetermined mass is between 3 g and 100 g.
  the receiving member is mounted on the output shaft so that the centre of gravity of the assembly, formed by the receiving member and by the mass of food product, is defined in a plane passing through the axis of displacement A which forms a predetermined angle of advance with a horizontal plane passing through the axis of displacement A of the output shaft.
  the discharging angle of the receiving member between the receiving position and the discharging position is between 0° and 180°.
  the weighing system comprises a vibrating device intended to allow the food product to be fully discharged from the receiving member into the discharging position.

The invention also relates to an apparatus for preparing a beverage based on a food product, the apparatus comprising a weighing system according to any of the preceding characteristics.

A characteristic of the apparatus is that it comprises a food product storage tank and a mixing chamber for receiving a predetermined mass of food product from the receiving member in the discharging position.

The invention further relates to a method for weighing and discharging a predetermined mass of a food product by means of a weighing system, the weighing system comprising at least one electric stepping motor having an output shaft and a receiving member which is secured in terms of displacement to the output shaft, the method comprising the following steps:
  a step of providing a food product,
  a step of discharging a quantity of food product onto or into the receiving member,
  a step of weighing the food product consisting of:
    applying a resistive torque to the output shaft for a predetermined mass of the food product by the electronic control unit,
    applying a static torque to the output shaft by the receiving member and the food product it contains or retains, and
    changing the position of the output shaft of the electric motor when the static torque is at least equal to the resistive torque.

The method comprises the following steps and/or characteristics taken alone or in combination:
  the food product comprises milk powder.
  a step of discharging the measured mass of food product.
  the electronic control unit controls the electric motor.

BRIEF DESCRIPTION OF THE FIGURES

The invention will be better understood, and other purposes, details, characteristics and advantages thereof will become clearer upon reading the following detailed explanatory description of embodiments of the invention given as purely illustrative and non-limiting examples, with reference to the appended schematic drawings in which.

DETAILED DESCRIPTION OF THE INVENTION

Figure 1:
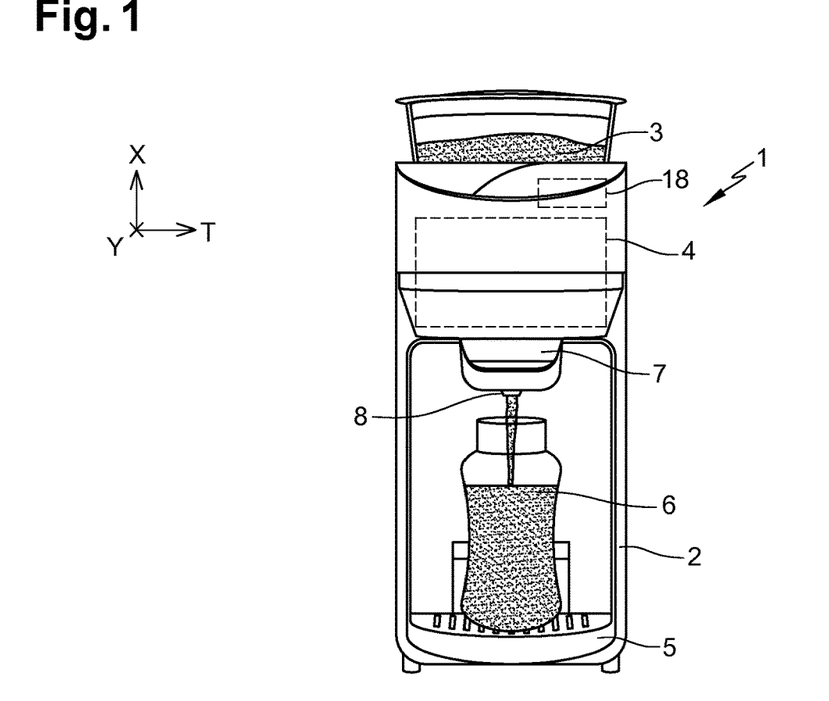
FIG. 1 is a front view of an apparatus intended to deliver a precise mass of a food product and to prepare a beverage with this precise mass according to the invention.

FIG. 1 shows an apparatus 1 for the preparation of beverage based on a food product such as the powder, the liquid, etc. The food product is preferably, but not exclusively, infant milk powder. The apparatus is particularly intended to deliver a precise mass of the food product to prepare the beverage.

The apparatus 1 comprises a frame 2, a food product storage tank 3 and a water tank (not shown). The frame 2 has a base 5 which is configured to receive a container 6 into which the beverage is discharged. The container 6 may be a baby bottle. The food product storage tank 3 is arranged above the base 5 along a longitudinal axis X (here vertical with reference to the plane of FIG. 1 and according to a situation of use of the apparatus arranged on a working surface). In this example, the water tank is arranged downstream of the base 5 along a first transverse axis Y (here horizontal and perpendicular to the plane of FIG. 1). The first transverse axis Y is perpendicular to the longitudinal axis X. In order to be able to weigh and discharge a predetermined mass of food product in a precise manner for the preparation of the beverage, the apparatus comprises a weighing system 10 which is described later in this description.

The predetermined and precise mass of food product is delivered to a mixing chamber 7 into which the water at a predetermined temperature is injected to promote the mixing of the food product (in this case milk powder and water). The water can be injected under pressure. The mixing chamber 7 is arranged between the base 5 and the weighing system 10 along the longitudinal axis X. The mixing chamber 7 comprises a nozzle 8 intended to dispense the beverage, which is arranged at a distance from the base 5. The nozzle 8 is opposite the base 5 along the longitudinal axis X. The nozzle 8 extends along the longitudinal axis from a bottom of the chamber towards the base. To this end, the apparatus 1 comprises a hydraulic circuit (not shown) which comprises a conduit comprising an inlet orifice connected to the water tank and an outlet orifice connected to the mixing chamber 7. The hydraulic circuit comprises a pump allowing to extract water from the water tank and its circulation through the conduit, as well as means for heating the water. These heating means are arranged on the conduit and arranged between the pump and the mixing chamber 7.

Figure 2:
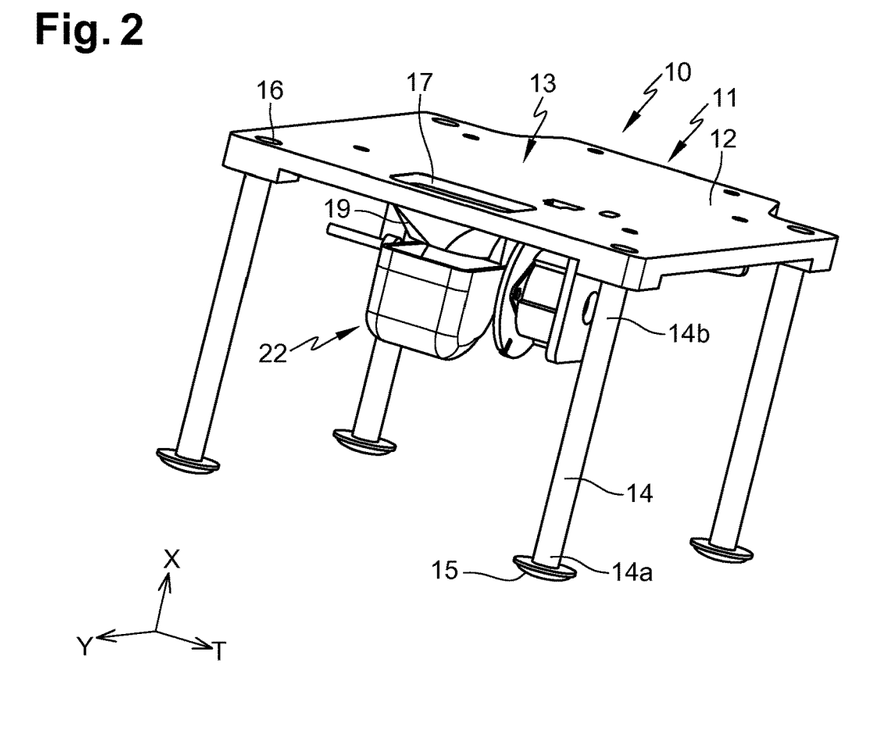
FIG. 2 is a perspective view of a weighing system for weighing a precise and determined mass of a food product according to the invention.

The weighing system 10 is shown in FIG. 2. The weighing system 10 is described in a situation of installation in the apparatus with an orthogonal coordinate X, Y, T. The weighing system 10 comprises a chassis 11 which is arranged in an enclosure 4 (shown dotted) of the frame 2, the enclosure being located above the mixing chamber 7 along the longitudinal axis X. The chassis 11 comprises a platform 12 with a first surface 13 defined in a plane that is orthogonal to the longitudinal axis X. The chassis 11 comprises feet 14 which allow to stabilise the platform 12 and to maintain the platform 12 at a distance from a bottom of the enclosure 4. In this example, there are four feet 14. Each foot 14 is elongated along the longitudinal axis between a first end 14a and a second end 14b. The first end 14a carries a base plate 15 intended to rest on the bottom of the enclosure 4 and the second end 14b is attached to the platform 12 by means of attachment members. To achieve this, the platform 12 comprises orifices 16, each of which receives the second end 14b of a foot 14. The attachment members comprise nuts, each of which is force-fitted into an orifice 16 and the internal thread of which cooperates with an external thread provided at the second end 14b of each foot. Of course, the attachment members can also comprise other attachment members such as studs, screws, glue, weld, etc.

The food product storage tank 3 is advantageously mounted on the platform 12. The storage tank 3 determines a storage volume for storing the food product. The platform 12 comprises an opening 17 which passes through its wall on either side along the longitudinal axis X. The storage tank 3 comprises a discharge orifice (not shown) which opens into the storage volume of the storage tank on the one hand and into the opening 17 in the platform 12 on the other hand. Advantageously, sealing means (not shown) for sealing the discharge orifice are provided to occupy an open position and a closed position of the discharge orifice. These sealing means are controlled by an electronic control unit 18 (see FIGS. 1, 6 and 11). The electronic unit is mounted in the apparatus 1 and in particular on the frame 2. The sealing means may comprise doors that pivot about an axis parallel to the plane of the first surface 13 of the platform 12 or at least one door sliding in the plane of the first surface 13. We can also see that a hopper 19 extends, along the longitudinal axis X, from a second surface 20 (see FIG. 5) of the platform 12. The opening 17 opens into the hopper 19 which extends it. In this example, the hopper 19 has a frustoconical cross-section (in the plane formed by the longitudinal axis and first transverse axis Y) which tapers towards an outlet orifice 21 (see FIGS. 5 and 8) of the hopper 19. The outlet orifice 21 of the hopper 19 is opposite (along the longitudinal axis X) to the opening 17 defined in the platform 12.

Figure 3:
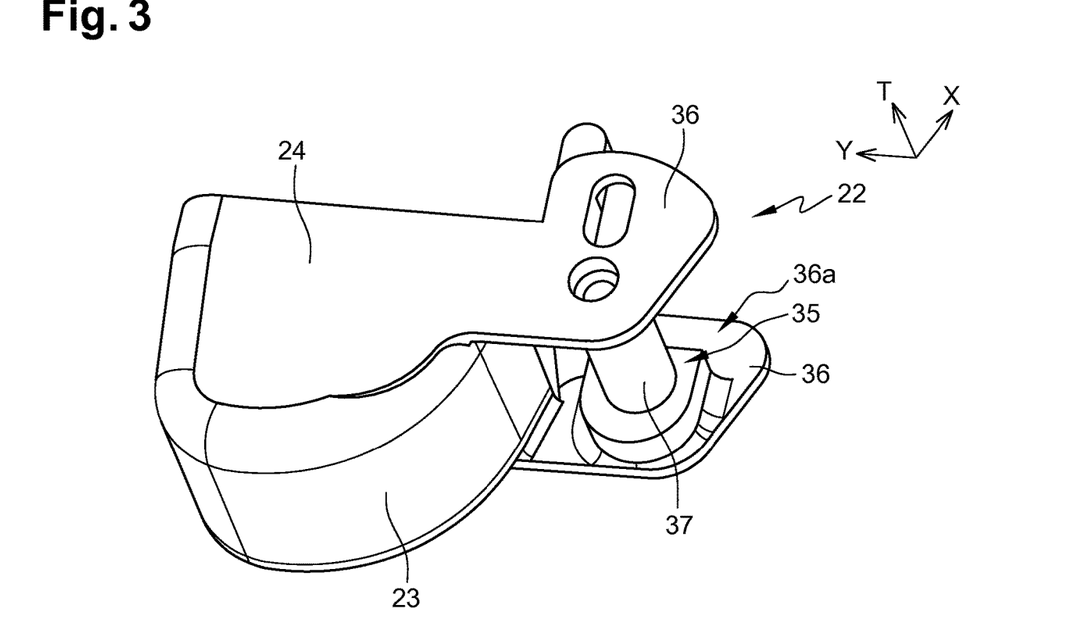
FIG. 3 shows a perspective view, substantially from below, of an example of a receiving member for receiving a food product according to the invention.
Figure 4:
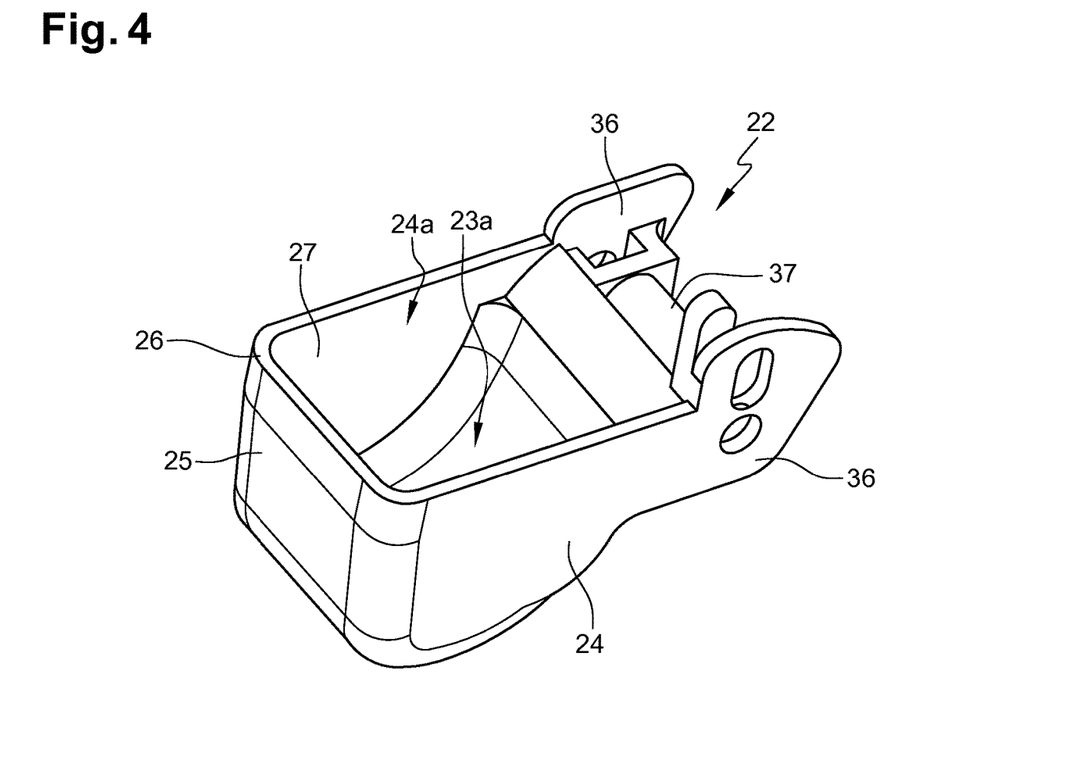
FIG. 4 shows a perspective view, substantially from above, of an example of a receiving member for receiving the food product according to the invention.

With reference to FIGS. 2, 3 and 4, the weighing system 10 comprises a receiving member 22 for receiving the food product fed by the storage tank 3. This receiving member 22 is movable along a displacement axis between a food product receiving position and a food product discharging position. Here, the receiving member 22 displaces in rotation about the axis of displacement. Advantageously, but without limitation, the receiving member 22 is in the form of a bucket. This bucket shape allows better control over the reception of the food product and the contents. In particular, the receiving member 22 comprises a receiving wall 23, two lateral partitions 24 extending from the lateral edges of the receiving wall 23 and an upstream partition 25 rising from an upstream edge of the receiving wall 23. The receiving wall 23 is the bottom of the receiving member and is curved. The lateral partitions 24 are opposite each other along a second transverse axis T and comprise internal surfaces 24a defined in substantially parallel planes. The terms "upstream" and "downstream" are defined in relation to the first transverse axis Y. The internal surfaces 24a face each other. The upstream partition is also connected to the upstream edges of the lateral partitions 24. The upstream partition 25 comprises an internal surface 25a defined in a plane which is perpendicular to the plane of the internal surfaces 24a of lateral partitions 24. The upstream partition 25, the two lateral partitions 24 and the receiving wall 23 form a volume for receiving a quantity of food product. At least the upstream partition 25 and the lateral partitions 24 each comprise a free edge 26 delimiting an opening 27 opening into the reception volume of the receiving member 22. The receiving wall 23 comprises a curved, concave internal surface 23a which faces the opening 27 of the bucket. The internal surface 23 acts as a receiving surface for receiving the food product.

Figure 5:
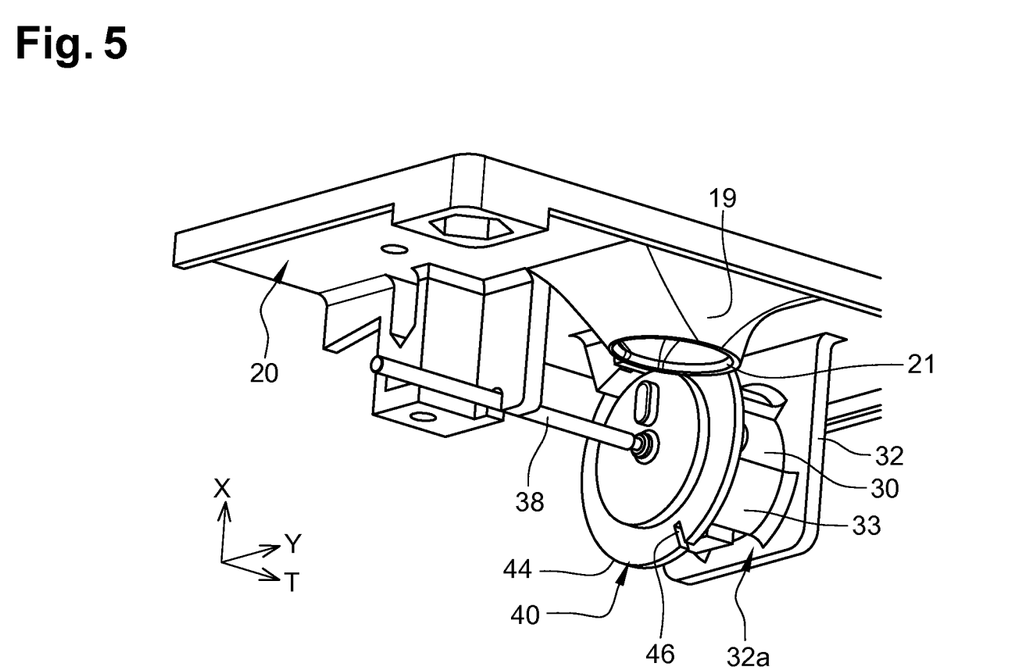
FIG. 5 shows a perspective view of an example of a motor installed on a chassis of a weighing system and detection means for detecting at least one position of the output shaft of the motor according to the invention.
Figure 6:
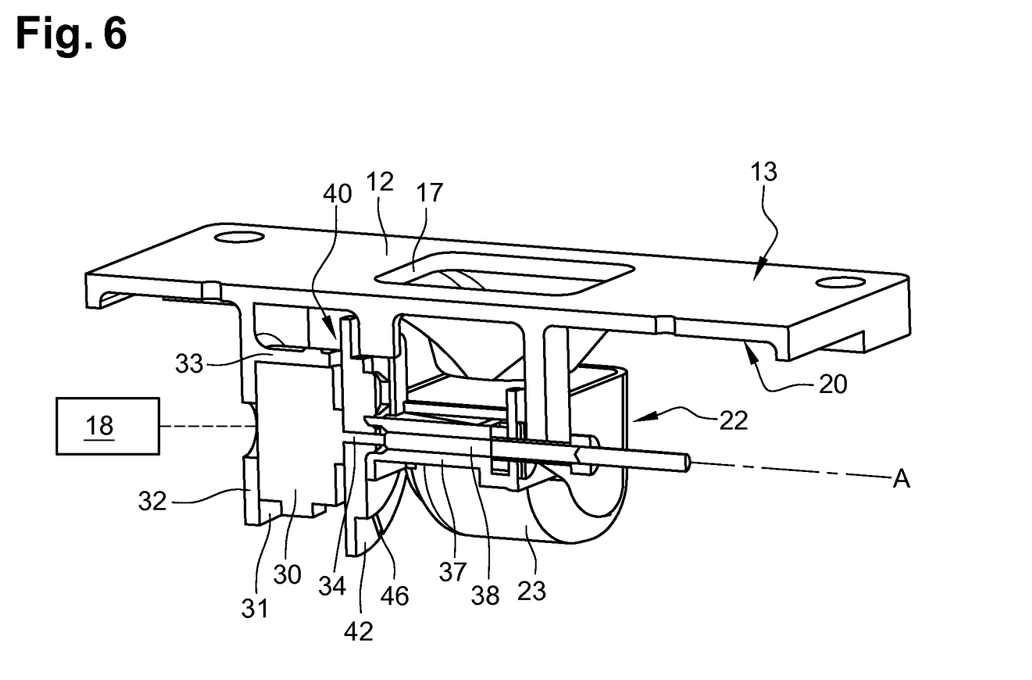
FIG. 6 is a perspective cross-sectional view of an example of a weighing system according to the invention.

In FIGS. 2, 5 and 6, the weighing system 10 comprises an electric motor 30 intended to drive the displacement of the receiving member 22 between the receiving position and the discharging position. The electric motor 30 is carried by the chassis 11 as shown. The chassis 11 comprises a housing 31 (see FIG. 6) in which the motor is removably arranged. More precisely illustrated in FIG. 6, the chassis 11 comprises a support wall 32 which extends from the second surface 20 of the platform 12 along the longitudinal axis X. The support wall 32 comprises an internal surface 32a that is defined in a plane that is perpendicular to the second transverse axis T. Projections 33 extend from the internal surface 32a of the support wall 32 and delimit at least partly the housing 31 suitable for receiving the electric motor 30. These projections 33 have a circular cross-section (along a plane XY (formed by the longitudinal axis X and by the first transverse axis Y)) and together form a cylindrical wall with an axis parallel to the second transverse axis T. In this example, there are three projections 33. Alternatively, a single cylindrical wall extends from the internal surface 33a of the support wall 32.

With reference to FIGS. 3, 4 and 6, the electric motor 30 comprises an output shaft 34 having a displacement axis A which is parallel to the second transverse axis T. The receiving member 22 is secured in terms of displacement to the output shaft 34 of the motor. To this end, as shown in FIGS. 3 and 4, the receiving member 22 comprises connecting means 35 for connecting to the output shaft 34 of the motor 30. In the present example, the receiving member 22 comprises two lateral wings 36 which extend the lateral partitions 24 downstream. The lateral wings 36 extend substantially along the first transverse axis Y. Each lateral wing 36 comprises an internal surface 36a which is defined in a plane perpendicular to the second transverse axis T. The internal surfaces 36a of the two lateral wings 36 face each other. The connecting means 35 comprise a hollow tube 37 which extends between the two lateral wings 36 of the receiving member 22. A drive shaft 38 is coupled to the output shaft 34 of the motor 30 and is secured in terms of displacement to the output shaft 34. The drive shaft 38 is coaxial with the displacement axis A. The drive shaft 38 is secured to the receiving member 22 so that the latter displaces simultaneously with the shaft 38. In particular, the drive shaft 38 is arranged inside the hollow tube 37. The drive shaft 38 has a diameter substantially equal to the internal diameter of the hollow tube 37. Alternatively, not shown, the connecting means 35 comprise ears connected to the receiving wall 23 and each ear comprises through holes along the second transverse axis T. The drive shaft 38 passes through the ears and is secured to them so as to be able to drive the displacement of the receiving member.

The electric motor 30 is a rotary stepping motor or a linear stepping motor. Using a stepping motor is very economical. In this example, the motor 30 is a rotary stepping motor. The output shaft 34 performs a rotation about the axis of displacement A. Similarly, the receiving member 22 pivots about this displacement axis A. A stepping motor allows a controlled and accurate rotation of the output shaft and is easy to control. The stepping motor comprises at least one rotor and one stator. The rotor is coupled to the output shaft 34. The stator carries at least two electric coils or electromagnets which produce a magnetic field. The magnetic field is generated by a current that appears when the motor is supplied with a predetermined voltage. The direction of a magnetic field circulating in the coils of the stators drive the rotation of the rotor. The output shaft 34 of the electric motor 30 rotates through a constant angle in response to each electrical pulse, allowing it to adopt different angular positions which are referred to as steps. The motor can have a predetermined number of steps. The angle can be between 0.9° and 45°. The output shaft 34 of the motor can take between 8 and 400 steps per revolution, depending on the motor.

The electric stepping motor 30 may comprise a permanent magnet stepping motor, a variable reluctance stepping motor or a hybrid stepping motor. Preferably, the electric motor 30 is a hybrid or permanent magnet stepping motor with a constant reluctance. The hybrid stepping motor comprises permanent magnets and allows to increase the reluctant torque compared with a stepping motor without permanent magnets. The hybrid motor is more efficient and requires less current to obtain the same torque.

The motor 30 is connected to the electronic control unit 18 intended to control the latter. The electronic control unit 18 also allows to supply power to the motor 30. The electronic control unit 18 comprises a power supply module intended to supply voltage to the electric motor and a controlling module for controlling the rotation of the output shaft 34 of the electric motor. The electronic control unit 18 is connected to a source of electrical power, such as the home network, for example, via the electrical cables of the apparatus 1 (not shown).

Figure 7:
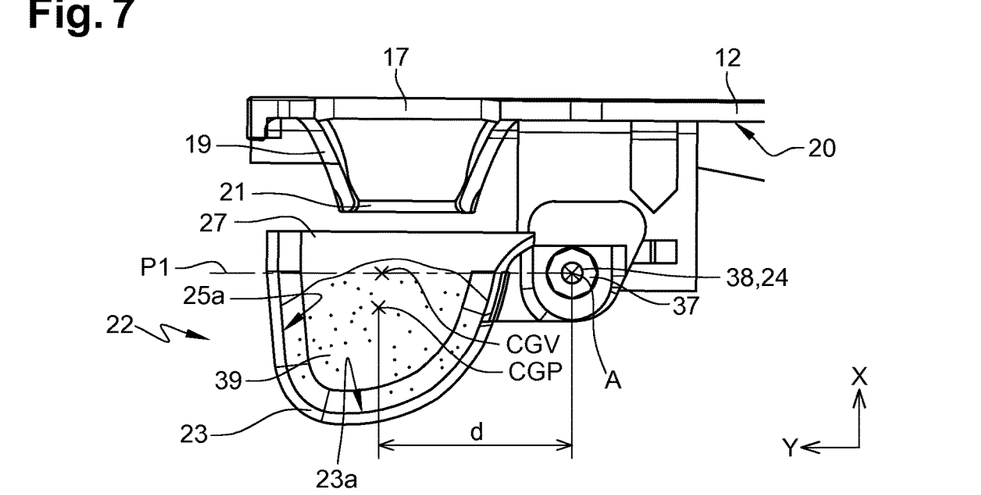
FIG. 7 shows an axial cross-sectional view of the weighing system with a receiving member in a receiving position according to the invention.

FIG. 7 shows the receiving member 22 in the receiving position. In this position, the receiving member 22 is configured to contain or retain a predetermined mass of the food product. The receiving member 22 is of course empty. In this position, the receiving surface (internal surface 23a) of the receiving member 22 is substantially opposite the opening 17 through which the food product is intended to fall by gravity into the receiving member 22. In this example, the free edge is defined in a plane perpendicular to the longitudinal axis and this plane is parallel to a plane P1 passing through the axis of displacement A of the output shaft 34. More precisely still, the centre of gravity CGV of the empty receiving member 22 is defined in the plane P1 passing through the axis of displacement of the output shaft 34. The plane P1 is assumed to be horizontal and perpendicular to the longitudinal axis X when the weighing system 10 is installed in the apparatus 1. The centre of gravity CGV of the receiving member 22 is determined by the barycentre of the elements constituting it. Here, the barycentre of the receiving member 22 is equal to the centre of gravity CGV.

Figure 8:
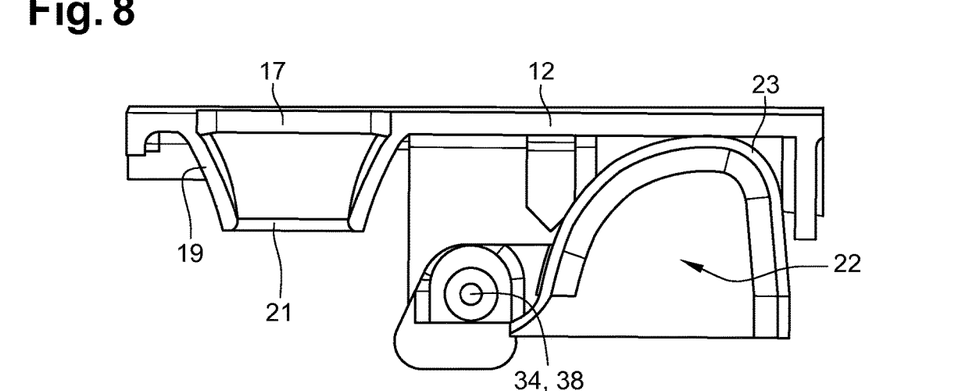
FIG. 8 is an axial cross-sectional view of the weighing system with a receiving member in the discharging position according to the invention.

FIG. 8 shows the receiving member 22 in the discharging position. In the discharging position, the receiving member 22 is configured to drop this predetermined mass. In the discharging position, the receiving surface (internal surface 23a) is at a distance from the opening 17. The receiving wall 23 faces and is substantially in contact with the second surface 20 of the platform 12. The figure shows that the receiving member 22 has pivoted, along the axis of displacement A, through a discharging angle of approximately 180° with respect to the horizontal plane P1 passing through the axis of displacement. The discharging angle is between 0° and 180°. Advantageously, the discharging angle is between 60° and 135°.

In one embodiment, the weighing system 10 comprises a vibratory device (not shown) designed to allow the full discharging of the food product (or cleaning) of the receiving member 22 in the discharging position. This vibrating device is particularly advantageous when the pivoting angle is less than 170° in relation to the horizontal plane P1. The vibrating device is electrically connected to the electronic control unit 18, which controls it when informed of the discharging position.

Figure 9:
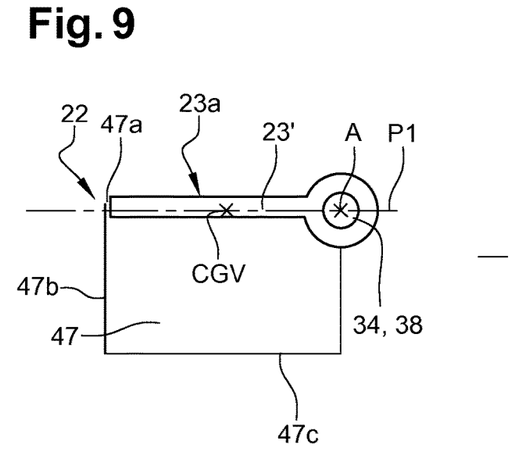
FIG. 9 schematically illustrates, in axial cross-section, another embodiment of a receiving member of a weighing system in the form of a receiving wall for closing a receptacle according to the invention.

In another embodiment shown schematically in FIG. 9, the receiving member 22 comprises the receiving wall 23' which is secured in terms of displacement to the output shaft 34 of the electric motor 30. The receiving wall 23' is intended to close or seal a receptacle 47 which is also secured in terms of displacement to the output shaft 34 of the motor 30. The receiving wall 23' carries the receiving surface 23a which is intended to receive the food product falling by gravity from the storage tank 3 and for weighing the mass of the food product as described below. The receptacle 47 receives the food product after the receiving wall 23' has been displaced into the discharging position once the quantity of food product has been weighed. More precisely, the receiving wall 23' is secured in rotation to the output shaft 34 of the motor 30. The receiving wall 23' may be connected directly to the output shaft 34 via connecting means 35 (ears, hollow tubes) or may be connected to the drive shaft 38 (via connecting means 35) which is coupled to the output shaft 34. The receptacle 47 has an opening 47a which is delimited by walls 47b and a bottom 47c from which the walls 47b rise. The receiving wall 23' is arranged at the level of the opening 47a to close the receptacle 47. The receiving wall 23' also has dimensions substantially equal to those of the opening 47, while allowing it to tilt inside the receptacle 47 when the mass of food product is reached. The receptacle 47 is arranged above the mixing chamber 7 along the longitudinal axis X. The centre of gravity CGV of the receiving member 22 is defined in the horizontal plane P1 passing through the axis of displacement A of the output shaft 34. The centre of gravity CGV of the receiving member corresponds to the barycentre of the receiving wall 23'. In this example, the receiving surface 23a is flat. However, the receiving surface 23a could have a concave shape to better retain the food product. This configuration allows larger quantities of food product to be measured.

The receiving member 22 is made from a polymer material or a composite material with a polymer matrix. An example of a material is Polycarbonate (PC) or Acrylonitrile Butadiene Styrene (ABS) or a mixture of these. The advantage of these polymer materials is that they are very light yet robust. The material can also be polypropylene (PP), polyoxymethylene (POM), polyamide (PA), etc.

Generally speaking, an electric stepping motor 30 is subject to a resistive torque (or reluctant torque) and a synchronous torque. The reluctant torque results from the resistance to the passage of a magnetic flux in the stator and rotor. The electric motor 30 is supplied with a predetermined voltage to maintain each angular position. This predetermined voltage is a function of the resistive torque applied to the output shaft 34 of the electric motor 30.

The weighing system 10 is configured to determine the mass of the food product by losing synchronism the motor, i.e. triggering the step change or the angular pivoting, while a resistive torque is applied to the output shaft 34 by the electronic control unit 18. To do this, the weighing system 10 is configured so that, in said receiving position, the receiving member 22 and the food product it contains or retains apply a static torque to the output shaft 34, and the electronic control unit 18 is configured so as to apply a resistive torque to the output shaft 34. In this way, when the static torque is at least equal to the resistive torque, the electric motor 30 (the output shaft 34) changes position. In particular, the resistive torque corresponds to a predetermined mass of the food product. This predetermined mass is that which must be discharged into the mixing chamber 7 to prepare the beverage.

We also understand that controlling the synchronous torque of the electric motor (and the electronic unit) of the weighing system, allow to adapt the weighing of the food product. In other words, it is possible to modify the mass value to be determined. For some weighing systems that use dimensional quantities, the mass to be determined is fixed. Such a weighing system is also much more precise than a system using dimensional quantities.

The value of the predetermined mass is between 3 g and 100 g. Preferably, the value is 8 g.

According to FIG. 7, the receiving member 22 is configured so that the food product 39, in this case the milk powder, after discharging (from the storage tank 3) forms a slope in or on the receiving member 22. The predetermined mass of food product 39 and the receiving member 22 have a centre of gravity CGP which is located at a predetermined distance d from the axis of displacement A. The distance d is virtually constant. The centre of gravity CGP of the assembly is arranged below the centre of gravity (CGV) of the receiving member 22 and below the horizontal plane P1 along the longitudinal axis X. The distance d multiplied by the weight of the mass of the assembly (formed by the mass of the food product and that of the receiving member), brought back to the centre of gravity CGP constitute a mechanical moment applied to the output shaft 34 of the motor 30. The moment becomes the static torque applied to the output shaft 34 of the motor 30.

Figure 10:
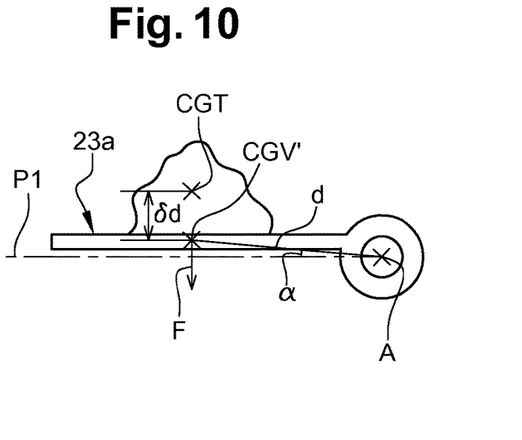
FIG. 10 schematically illustrates, in axial cross-section, another embodiment of a receiving member of a weighing system in the form of a receiving wall for closing a receptacle according to the invention.

According to an example of embodiment shown in FIG. 10, the receiving member 22 (with the receiving wall 23') defines a flail at an angle relative to a horizontal plane passing through the axis of displacement A of the motor 30. In other words, the receiving member 22 is mounted on the output shaft 34 at a predetermined angle of advance α (alpha). This angle α is between 1.8° and 8°. As illustrated, a slope of milk powder is arranged on the receiving surface 23a of the receiving wall 23'. The centre of gravity CGT of the sloping food product is arranged above the receiving surface 23a. The point of application of the force F exerted by the slope is defined on the receiving surface 23a and passes through the centre of gravity CGV' of the receiving member 22. The receiving member 22 is connected to the output shaft 34 so that the centre of gravity of the assembly CGP (powder and receiving member 22) is above the horizontal plane P1 passing through the axis of displacement of the motor. The centre of gravity CGP is defined in a plane passing through the axis of displacement A, which forms the angle of advance α with the plane P1. So when the motor loses of synchronism, the static torque increases rather than decreases. The moment (F*d*cos (a)) increases without increasing the mass of the food product. This arrangement allows to improve the sensitivity of the weighing system.

Figure 11:
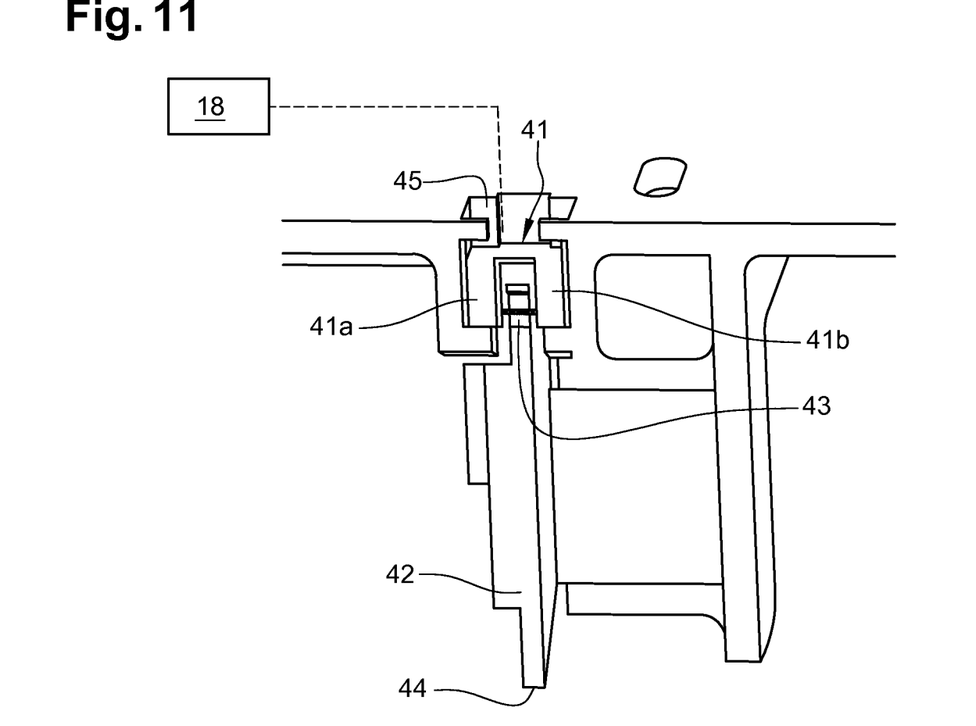
FIG. 11 shows a partial cross-sectional view of the detection means for detecting the positions of the output shaft of the electric motor of the weighing system according to the invention.

With reference to FIGS. 5 and 11, the weighing system 10 comprises detection means 40 capable of detecting at least one angular position of the output shaft 34 of the electric motor 30. The detection means 40 are connected to the electronic control unit 18, which is configured to act on the motor 30 if a change in step or in angular position of the motor is detected. The detection means 40 comprise an emitter of a light beam (visible or non-visible) and a receiver of the light beam. The receiver is arranged opposite the emitter. The emitter and the receiver are connected to the electronic control unit 18. In the present example, the detection means comprise an optical fork 41 comprising a first leg 41a on which the emitter is mounted and a second leg 41b on which the receiver is mounted. The light beam can be an infrared beam. The detection means 40 comprise an obstacle member 42 which is secured to the output shaft 34. This obstacle member 42 is intended to be interposed in the path of the light beam depending on the angular position of the output shaft 34. In the example shown, the obstacle member 42 comprises a disc with a central axis coaxial with the axis of displacement A of the output shaft 34 and secured in rotation to the output shaft 34. In this way, when the motor 30 loses of synchronism (the motor changes step), the disc pivots at the same time as the output shaft 34. The disc comprises at least one first slot 43 which extends radially from the periphery 44 of the disc towards the central axis of the disc. The slot 43 is intended to be passed through by the light beam (as shown as a dotted line in FIG. 11). To this end, the first leg 41a and the second leg 41b extend respectively on either side of a portion of the disc 42 along the transverse axis T. The optical fork 41 is installed in a housing 45 formed in the platform 12 of the chassis 11. The housing 45 opens onto the first surface 13 and onto the second surface 20 of the platform. A portion of the disc extends through the housing 45 and transversely between the emitter and the receiver. The obstacle member 42, in this case the disc, is easy to install and does not introduce any parasitic torque on the output shaft 34 of the motor. Alternatively, the obstacle member 42 comprises a cam. In particular, when the light beam passes through the slot, the electronic control unit 18 controls the maintain of the position of the output shaft 34 of the motor by applying the resistive torque. In this case, the receiving member 22 is fed with food product. When the light beam is interrupted, this means that the light beam is scanning a solid surface of the disc and that the output shaft 34 has rotated by at least one step (first angular position). In this case, the electronic control unit 18 controls the output shaft 34 to drive the receiving member 22 into the discharging position.

The detection means 40 are able to detect another angular position (second position) of the output shaft 34 of the electric motor 30. Advantageously, the disc comprises a second slot 46, visible in FIG. 6, intended to allow the detection of the second position of the output shaft 34 and in particular of the receiving member 22. The first slot 43 and the second slot 46 are arranged at 180° to each other. This second slot 46 acts as a stroke-end detection element for the receiving member 22 in the discharging position.

Figure 12:
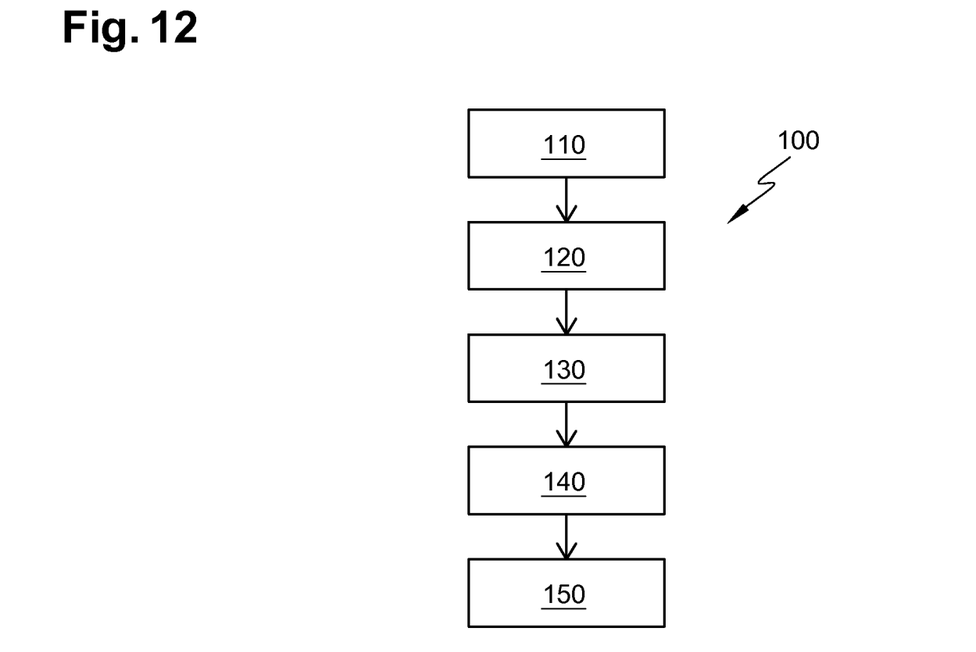
FIG. 12 shows the various steps of a method for weighing and discharging a predetermined mass of food product according to the invention.

We will now describe a method 100 for weighing and discharging a predetermined mass of a food product by means of the weighing system 10 as described above. The method 100 is illustrated in FIG. 12. The method comprises a step 110 of providing a food product. During this step, the food product is arranged in the storage tank 3 located above the weighing system 10. Preferably, the food product comprises an infant milk powder. The method comprises a step of discharging 120 a quantity of food product onto or into the receiving member 22. In particular, the food product is discharged so as to form a slope on the receiving surface 23a of the receiving member 22. The receiving surface 23a is flat or hollow as previously described. During this step, the electronic control unit 18 sends a control command to the sealing means to open the discharge orifice of the storage tank 3. A quantity of food product is thus discharged onto or into the receiving member 22 via the opening 17 in the platform 12 and in the hopper 19, which guides the food product towards the receiving member 22. The food product 39 can be guided into the receiving volume of the receiving member 22 in the case of the bucket. The milk powder is discharged continuously or discontinuously onto the receiving surface 23a of the receiving member 22.

The method comprises a step of weighing 130 a predetermined mass of the food product in the receiving member 22. This step 130 consists of carrying out a loss of synchronism of the motor. In particular, the weighing step 130 comprises a sub-step in which the electronic control unit 18 applies a resistive torque to the output shaft 34 of the motor 30. This resistive torque is a function of the supply voltage. For example, a voltage of 12V corresponding to a resistive torque of 16 mNm is applied to the motor 30. This resistive torque corresponds to a powder mass of approximately 8 g. When the receiving member 22 and the food product contained in the receiving member apply a static torque which is equal to the resistive torque, the output shaft 34 pivots and changes step. As long as the mass of milk powder in the receiving member 22 (or on the receiving surface 23a) together with the mass of the receiving member does not reach this predetermined value, the milk powder continues to discharge into the receiving member 22.

The method 100 comprises a step 140 of discharging the weighed mass of powder. In particular, as soon as the mass is reached, the output shaft 34 changes step or angular position without any action from the motor itself or command from the electronic control unit 18. At the same time, the obstacle member 42, in this case the disc, cuts off the light beam between the emitter and its receiver. The detection means 40 and in particular the optical fork 41 send a control signal relating to the position of the output shaft 34 to the electronic control unit 18. The latter sends a control command to the motor 30 to drive the rotation of the output shaft 34 and the receiving member 22 into the discharging position. Simultaneously with the discharging step 140 or beforehand, the method comprises a step of stopping the discharging 150 of the food product into the receiving member 22. In this case, the electronic control unit 18 sends a control command to the sealing means to close the orifice for discharging the storage tank 3.

The invention claimed is:

1. A weighing system for weighing and discharging a predetermined mass of a food product, the system comprising:
    a chassis,
    an electric stepping motor carried by the chassis and having an output shaft capable of adopting different positions along a displacement axis,
    a receiving member for receiving a food product which is movable along the axis of displacement between a receiving position for receiving the food product and a discharging position for discharging the food product, the receiving member being configured to contain or retain a predetermined mass of the food product in the receiving position and to let this mass fall in the discharging position,
    an electronic control unit for controlling the electric motor, wherein the receiving member is secured in terms of displacement to the output shaft and in that the weighing system is configured so that, in said receiving position, the receiving member and the food product it contains or retains, apply a static torque to the output shaft, and that the electronic control unit is configured so as to apply a resistive torque, for a predetermined mass of the food product, to the output shaft so that, when the static torque is at least equal to the resistive torque, the output shaft changes position.

2. The weighing system according to claim 1, wherein the electronic control unit is configured to control the displacement of the output shaft and the displacement of the receiving member between the receiving position and the discharging position when the mass of food product reaches a predetermined value.

3. The weighing system according to claim 1, wherein the predetermined mass of the food product contained in the receiving member and the receiving member have a centre of gravity which is located at a predetermined distance from the axis of displacement A.

4. The weighing system according to claim 1, wherein the receiving member comprises connecting means secured to a drive shaft, said drive shaft being coupled in rotation to the output shaft of the electric motor which is movable in rotation.

5. The weighing system according to claim 1, wherein the receiving member is in the form of a bucket or of a receiving wall.

6. The weighing system according to claim 1, wherein the chassis comprises a platform provided with an opening passing through the wall of the platform on either side and through which the food product is intended to fall by gravity.

7. The weighing system according to claim 1, wherein it comprises detection means capable of detecting at least one position of the output shaft of the stepping motor, the detection means being connected to the electronic control unit.

8. The weighing system according to claim 1, wherein the predetermined mass is between 3 and 100 g.

9. The weighing system according to claim 1, wherein the receiving member is mounted on the output shaft so that the centre of gravity of the assembly formed by the receiving member and the mass of food product is defined in a plane passing through the axis of displacement A which forms a predetermined angle of advance with a horizontal plane passing through the axis of displacement A of the output shaft.

10. An apparatus for preparing a beverage based on a food product, comprising a weighing system according to claim 1.

11. The apparatus according to claim 10, comprising a storage tank for food product and a mixing chamber intended to receive a predetermined mass of food product from the receiving member in the discharging position.

12. A method for weighing and discharging a predetermined mass of a food product by means of a weighing system, the weighing system comprising at least one electric stepping motor having an output shaft and a receiving member which is secured in terms of displacement to the output shaft, the method comprising the following steps:

a step of providing a food product, a step of discharging a quantity of food product onto or into the receiving member, a step of weighing a food product consisting of applying a resistive torque to the output shaft for a predetermined mass of food product by an electronic control unit, applying a static torque to the output shaft by the receiving member and the food product it contains or retains, changing the position of the output shaft of the electric motor when the static torque is at least equal to the resistive torque.

13. The method according to claim 12, wherein the food product comprises milk powder.

* * * * *